(12) United States Patent
Storozuk (10) Patent No.: US 8,355,710 B2
(45) Date of Patent: Jan. 15, 2013

(54) SYSTEM AND METHOD OF INITIATING USER NOTIFICATION FOR A WIRELESS DEVICE

(75) Inventor: John Storozuk, Kitchener (CA)

(73) Assignee: Research In Motion Limited, Waterlook (CA)

( * ) Notice: Subject to any disclaimer, the term of this patent is extended or adjusted under 35 U.S.C. 154(b) by 869 days.

(21) Appl. No.: 12/118,195

(22) Filed: May 9, 2008

(65) Prior Publication Data

US 2009/0280782 A1 Nov. 12, 2009

(51) Int. Cl.
*H04M 3/00* (2006.01)

(52) U.S. Cl. ........ 455/419; 455/458; 455/418; 455/420; 455/414.1; 455/412.2; 340/686.1; 340/679; 340/540; 709/218; 709/223; 709/201.02

(58) Field of Classification Search .................. 455/412, 455/412.2, 456.1, 414.1, 458, 418, 419, 420; 709/206, 218, 223, 201.02; 340/686.4, 679, 340/540

See application file for complete search history.

(56) References Cited

U.S. PATENT DOCUMENTS

| 6,606,504 | B1 | 8/2003 | Mooney et al. | |
|---|---|---|---|---|
| 2006/0161628 | A1* | 7/2006 | Nagy et al. | 709/206 |
| 2009/0149192 | A1* | 6/2009 | Vargas et al. | 455/456.1 |

FOREIGN PATENT DOCUMENTS

| EP | 1 083 764 | 3/2001 |
|---|---|---|
| EP | 1 170 969 | 1/2002 |
| EP | 1 684 535 | 7/2006 |

OTHER PUBLICATIONS

European Search Report, European Patent Application No. EP 08155949, Nov. 11, 2008.
2.4 GHz Cordless Telephone with Caller 10, Clarity C600 User Guide, total of 32 pages. Retrieved from http://www.harriscomm.com/catalog/newsletter/support/C600_Man.pdf on Apr. 7, 2008.
Warden Security, Mobile Device security solution for Palm Treo device, total of 69 pages. Retrieved from http://lockmytreo.com/download/Warden-PUG.PDF on Jan. 4, 2008.
Cell Phones: Find your cell phone with Google Maps' click-to-call, total of 5 pages. Retrieved from http://lifehacker.com/software/cell-phones/find-your-cell-phone-with-google-maps-click+to+call-226988.php on Apr. 7, 2008.
Mobile Phone Tracking: GSM mobile phone tracking system via the GPS-TRACK satellite network, total of 1 page. Retrieved from http://www.sat-gps-locate.com/english/index.html on Apr. 10, 2008.
Berry Locator, total of 2 pages. Retrieved from http://www.mobireport.com/apps/bl/ on Apr. 28, 2008.

* cited by examiner

*Primary Examiner* — Patrick Edouard
*Assistant Examiner* — Fred Casca (57) ABSTRACT

A System and Method of initiating user notification for a wireless device is provided for allowing a user to locate the wireless device when it has been accidentally misplaced. Notification settings of a wireless device indicate whether incoming communication triggers user notification. If the wireless device has been configured to not ring, then calling the wireless device will not help the user to locate the wireless device. A message (e.g. email, SMS) configured for prompting user notification notwithstanding the notification settings is sent to the wireless device. The message is routed through a wireless network and received by the wireless device. In accordance with an embodiment of the disclosure, in response to the message, the wireless device executes a user notification notwithstanding the notification settings. In some implementations, the user notification includes audible ringing, which might help the user to locate the wireless device based on the audible ringing.

18 Claims, 5 Drawing Sheets

SYSTEM AND METHOD OF INITIATING USER NOTIFICATION FOR A WIRELESS DEVICE

FIELD OF THE DISCLOSURE

This disclosure relates to wireless communication, and more particularly to initiating user notification for a wireless device.

BACKGROUND

A wireless device such as a cell phone or PDA (Personal Digital Assistant) provides a user with various functionality such as telephony, email, text messaging, etc. The user can be provided with this functionality even when the user moves from one location to another location. Wireless devices offer the user the flexibility of mobility, which is absent in wired devices.

Although the flexibility of mobility can offer advantages for the user, at the same time there might be certain disadvantages. In particular, since the wireless device is portable, the user might accidentally misplace the wireless device. The result is that the user might have to spend time looking for the wireless device. Looking for the wireless device can be time consuming and annoying for the user.

An existing approach for finding the wireless device is to call the wireless device using another phone. Upon hearing audible ringing from the wireless device, the user can typically locate the wireless device based on the audible ringing. However, if the wireless device has been configured to not ring, then calling the wireless device will not help the user to locate the wireless device. Thus, the existing approach does not adequately solve the problem.

BRIEF DESCRIPTION OF THE DRAWINGS

Embodiments will now be described with reference to the attached drawings in which.

DETAILED DESCRIPTION OF EMBODIMENTS

According to a broad aspect, there is provided a method for execution in a wireless device, the method comprising: maintaining notification settings that indicate whether incoming communication triggers user notification; receiving a message that is routable through a wireless network; determining whether the message is to trigger user notification notwithstanding the notification settings; and if the message is to trigger user notification notwithstanding the notification settings, executing a user notification notwithstanding the notification settings; wherein executing the user notification notwithstanding the notification settings comprises: if the notification settings indicate that incoming communication should not trigger user notification: overriding the notification settings; and executing the user notification.

According to another broad aspect, there is provided a computer readable medium having computer executable instructions stored thereon for execution on a processor so as to implement a method comprising: maintaining notification settings that indicate whether incoming communication triggers user notification; receiving a message that is routable through a wireless network; determining whether the message is to trigger user notification notwithstanding the notification settings; and if the message is to trigger user notification notwithstanding the notification settings, executing a user notification notwithstanding the notification settings; wherein executing the user notification notwithstanding the notification settings comprises: if the notification settings indicate that incoming communication should not trigger user notification: overriding the notification settings; and executing the user notification.

According to another broad aspect, there is provided a wireless device comprising: notification settings that indicate whether incoming communication triggers user notification; a wireless access radio for receiving a message that is routable through a wireless network; a notification initiator that determines whether the message is to trigger user notification notwithstanding the notification settings, and if the message is to trigger user notification notwithstanding the notification settings, initiates a user notification notwithstanding the notification settings; and a user interface for executing the user notification.

According to another broad aspect, there is provided a method for execution in a computing device, the computing device being capable of communicating with a wireless device having notification settings that indicate whether incoming communication triggers user notification, the method comprising: receiving input for initiating user notification by the wireless device notwithstanding the notification settings; and in response to the input, sending a message for prompting user notification notwithstanding the notification settings, the message being routable through the wireless network.

According to another broad aspect, there is provided a computer readable medium having computer executable instructions stored thereon for execution on a processor so as to implement a method in a computing device, the computing device being capable of communicating with a wireless device having notification settings that indicate whether incoming communication triggers user notification, the method comprising: receiving input from a designated input for initiating user notification by the wireless device notwithstanding the notification settings; and in response to the input, sending a message for prompting user notification notwithstanding the notification settings, the message being routable through the wireless network.

According to another broad aspect, there is provided a computing device capable of communicating with a wireless device having notification settings that indicate whether incoming communication triggers user notification, the computing device comprising: a user interface comprising a designated input for sending a message for prompting user notification notwithstanding notification settings; and a notification messenger that, in response to activation of the designated input, sends a message configured for prompting user notification notwithstanding the notification settings, the message being routable through the wireless network.

Other aspects and features of the present disclosure will become apparent, to those ordinarily skilled in the art, upon review of the following description of the specific embodiments of the disclosure.

Communication System

Figure 1:
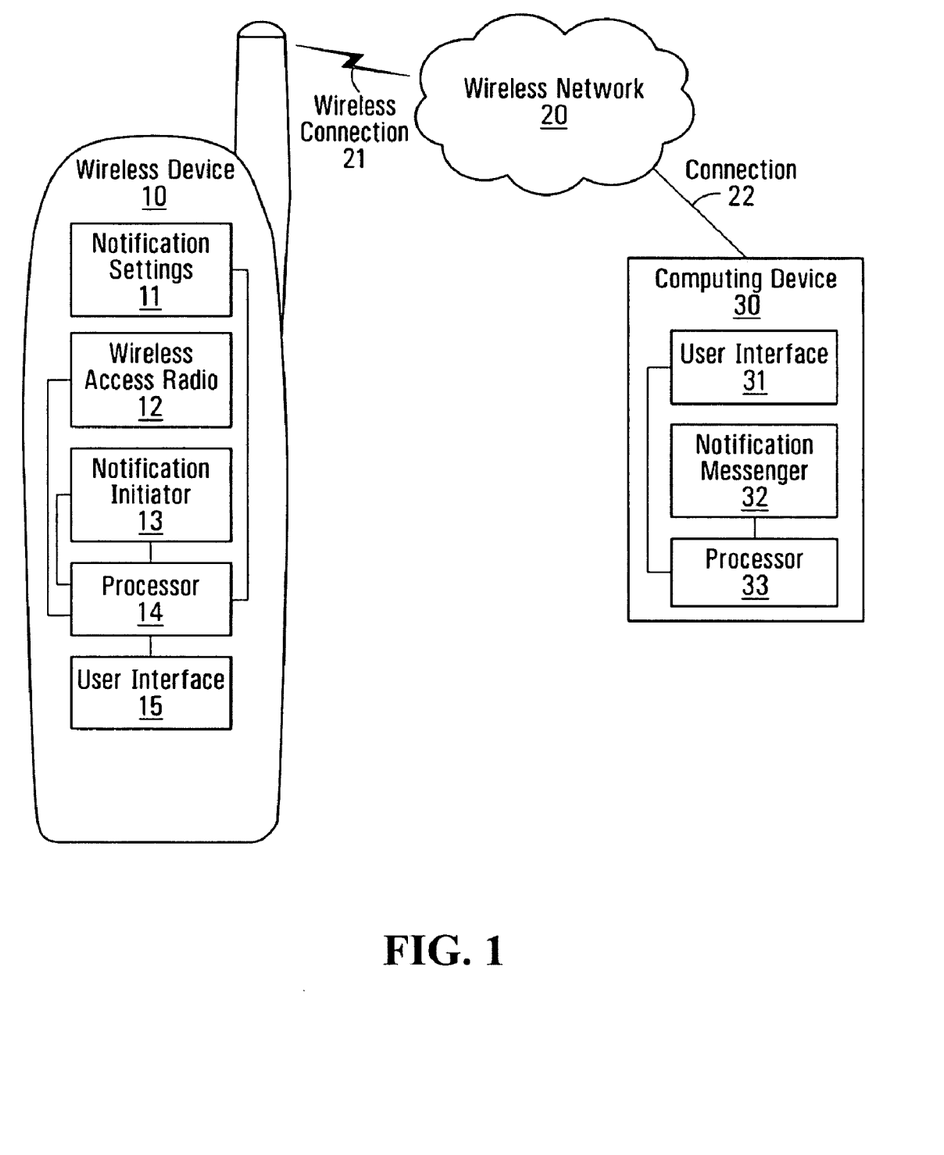
FIG. 1 is a block diagram of an example communication system featuring a wireless device and another computing device.

Referring first to FIG. 1, shown is a block diagram of an example communication system featuring a wireless device 10 and another computing device 30. The communication system has a wireless network 20 through which the wireless device 10 and the computing device 30 can communicate. The communication system may have other components, but they are not shown for sake of simplicity. The wireless device 10 has notification settings 11, a wireless access radio 12, a notification initiator 13, a processor 14, and a user interface 15. The computing device 30 has a user interface 31, a notification messenger 32, and a processor 33. The wireless device 10 and the computing device 30 may have other components, but they are not shown for sake of simplicity.

In operation, the wireless device 10 communicates with the wireless network 20 using its wireless access radio 12. The wireless communication is over a wireless connection 21 between the wireless device 10 and the wireless network 20. The computing device 30 may similarly communicate with the wireless network 20 over a connection 22, which might be wired or wireless depending on whether the computing device 30 is a wireless device. In the illustrated example, it is assumed that the computing device 30 is used by the same user as the wireless device 10.

Since the wireless device 10 is mobile, the user of the wireless device 10 might accidentally misplace the wireless device 10. The notification settings 11 of the wireless device 10 indicate whether incoming communication triggers user notification. If the wireless device 10 has been configured to not ring, then calling the wireless device 10 will not help the user to locate the wireless device 10.

The user interface 31 of the computing device 30 is used for initiating user notification by the wireless device 10 notwithstanding the notification settings 11. In accordance with an embodiment of the disclosure, in response to the user input, the notification messenger 32 of the computing device 30 sends to the wireless device 10 a message for prompting user notification notwithstanding the notification settings 11. The message is routed through the wireless network 20 and received by the wireless device 10. In accordance with an embodiment of the disclosure, in response to the message, the notification initiator 13 initiates a user notification notwithstanding the notification settings 11. The user interface 15 executes the user notification.

If the notification settings 11 indicate that incoming communication should not trigger user notification, then the notification initiator 13 overrides the notification settings 11 and subsequently initiates the user notification. Note that if the notification settings 11 indicate that incoming communication should trigger user notification, then there might be no need to override the notification settings 11. However, note that the notification settings 11 might be overridden in order to change the way in which the user notification is executed. For instance, the notification settings 11 might be overridden in order to allow an audible ringing when the notification settings 11 would otherwise not allow this.

There are many possibilities for the user notification. In some implementations, the user notification depends on notification means of the user interface 15. The user interface 15 might for example include a speaker, an LED (light emitting diode), an LCD (Liquid Crystal Display) screen, a motor for vibrating, etc. In some implementations, the user notification includes audible ringing, which might help the user to locate the wireless device 10 based on the audible ringing. More generally, the user notification can include one or more appropriate notifications such as an audible noise, a flashing light, and vibrations, etc. In some implementations, the user notification includes all notification means of the user interface 15. It might help the user locate the wireless device 10 if the wireless device 10 simultaneously rings, has flashing lights, and vibrates. In some implementations, the user notification occurs for a predetermined time duration. In other implementations, the user notification occurs according to a predetermined schedule. Other implementations are possible.

There are many possibilities for the message for prompting user notification notwithstanding the notification settings 11. In some implementations, the message is a packet switched message, for example an email message or an SMS message. In some implementations, the packet switched message is configured for prompting user notification notwithstanding the notification settings 11. For example, in some implementations, the packet switched message includes a command prompting user notification notwithstanding the notification settings 11. The command might for example be a keyword such as "locate me". Other commands are possible. The command might be part of a message header, or part of a message body. The format and location of the command within the message might depend on the type of packet switched message being used. In some implementations, the message also includes a user address for use in routing the packet switched message to the wireless device 10 through a wireless network.

In alternative implementations, the message is a circuit switched message, for example a phone call from a particular phone number. The wireless device 10 can determine whether the circuit switched message is to trigger user notification notwithstanding the notification settings 11 based on the origin of the phone call. For instance, in some embodiments, the wireless device 10 determines that the circuit switched message is to trigger user notification notwithstanding the notification settings 11 if the circuit switched message originates from a trusted source, for example a known call centre.

More generally, the message can be any appropriate message from which the wireless device 10 can deduce that user notification is to be executed notwithstanding the notification settings 11. In some implementations, the message does not include any explicit encoding that would indicate that user notification is to be executed notwithstanding the notification settings 11. In other implementations, the message includes specific encoding for instructing the wireless device 10 that user notification is to be executed notwithstanding the notification settings 11. Other implementations are possible.

There are many possibilities for the computing device 30. In some implementations, the computing device 30 is a wireless device. In other implementations, the computing device 30 is a personal computer. More generally, the computing device 30 can be any computing device capable of sending a message for prompting user notification notwithstanding the notification settings 11.

As noted above, it is assumed that the computing device 30 is used by the user. In alternative implementations, the user does not directly use the computing device 30. For example, in alternative implementations, the computing device 30 is an enterprise server. A system administrator could initiate user notification notwithstanding the notification settings 11. In other implementations, the computing device 30 is a call center device. Again, a system administrator could initiate user notification notwithstanding the notification settings 11. Alternatively, the call center device could automatically initiate user notification notwithstanding the notification settings 11 in response to a phone call. Further details are provided below with reference to FIG. 4. Other implementations are possible.

In some implementations, the computing device 30 is any existing computing device that can send a message for prompting user notification notwithstanding the notification settings 11. In alternative implementations, the user interface 31 of the computing device 30 includes a designated input that when activated causes the computing device 30 to send a message for prompting user notification notwithstanding the notification settings 11. The designated input might for example include a single designated button or a designated menu item. Other implementations are possible.

In the illustrated example, the notification initiator 13 of the wireless device 10 is implemented as software and is executed on the processor 14 of the wireless device 10. Also, the notification messenger 32 of the computing device 30 is implemented as software and is executed on the processor 14 of the computing device 30. However, more generally, the notification initiator 13 and the notification messenger 32 may each be implemented as software, hardware, firmware, or any appropriate combination thereof. Although shown as single components, more generally, the notification initiator 13 and the notification messenger 32 may each have one or more components. The one or more components may be integrated with other components. Also, functionality of the notification initiator 13 and the notification messenger 32 might be combined with other components. For example, in alternative implementations, the notification initiator 13 and the notification settings 11 are combined as a single component. Other implementations are possible.

Method in a Wireless Device

Figure 2:
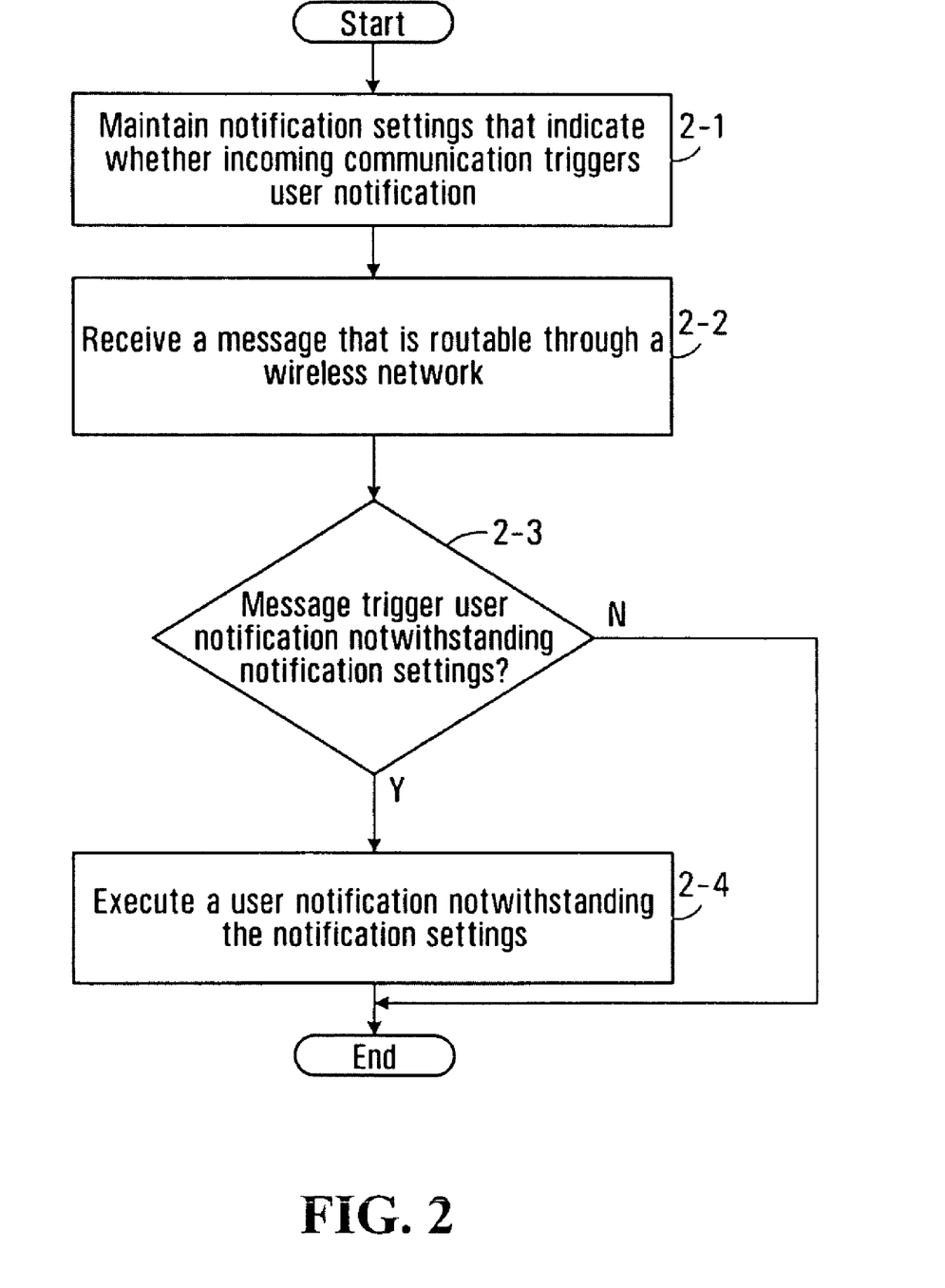
FIG. 2 is a flowchart of a method of a wireless device executing a user notification.

Referring now to FIG. 2, shown is a flowchart of a method of a wireless device executing a user notification. This method may be implemented in a wireless device, for example by the notification initiator 13 of the wireless device 10 shown in FIG. 1. Alternatively, this method may be implemented in any appropriately configured wireless device. For this method it is assumed that the user has accidentally misplaced the wireless device. However, note that this is not a requirement for executing the method.

At step 2-1, the wireless device maintains notification settings that indicate whether incoming communication triggers user notification. If the wireless device has been configured to not ring, then calling the wireless device will not help the user to locate the wireless device. A message for prompting user notification notwithstanding the notification settings is sent to the wireless device. Example details for the message have been described above. The message is routed through a wireless network and received by the wireless device at step 2-2. At step 2-3 the wireless device determines whether the message is to trigger user notification notwithstanding the notification settings. Upon determining that the message is to trigger user notification notwithstanding the notification settings, the wireless device executes a user notification notwithstanding the notification settings at step 2-4. The user notification can help the user to locate the wireless device. Example details for the user notification have been described above.

There are many ways for the wireless device to determine whether the message is to trigger user notification notwithstanding the notification settings. This determination might depend on the type and format of the message. In some implementations, when the message is a packet switched message such as an email or SMS message, the wireless device determines that the message is to trigger user notification notwithstanding the notification settings if the message has a command such as the keyword "locate me". In other implementations, when the message is a circuit switched message such as a phone call, the wireless device determines that the message is to trigger user notification notwithstanding the notification settings if the originating phone number of the message is trusted. More generally, any suitable determination can be performed in light of the type and format of the message.

Figure 3:
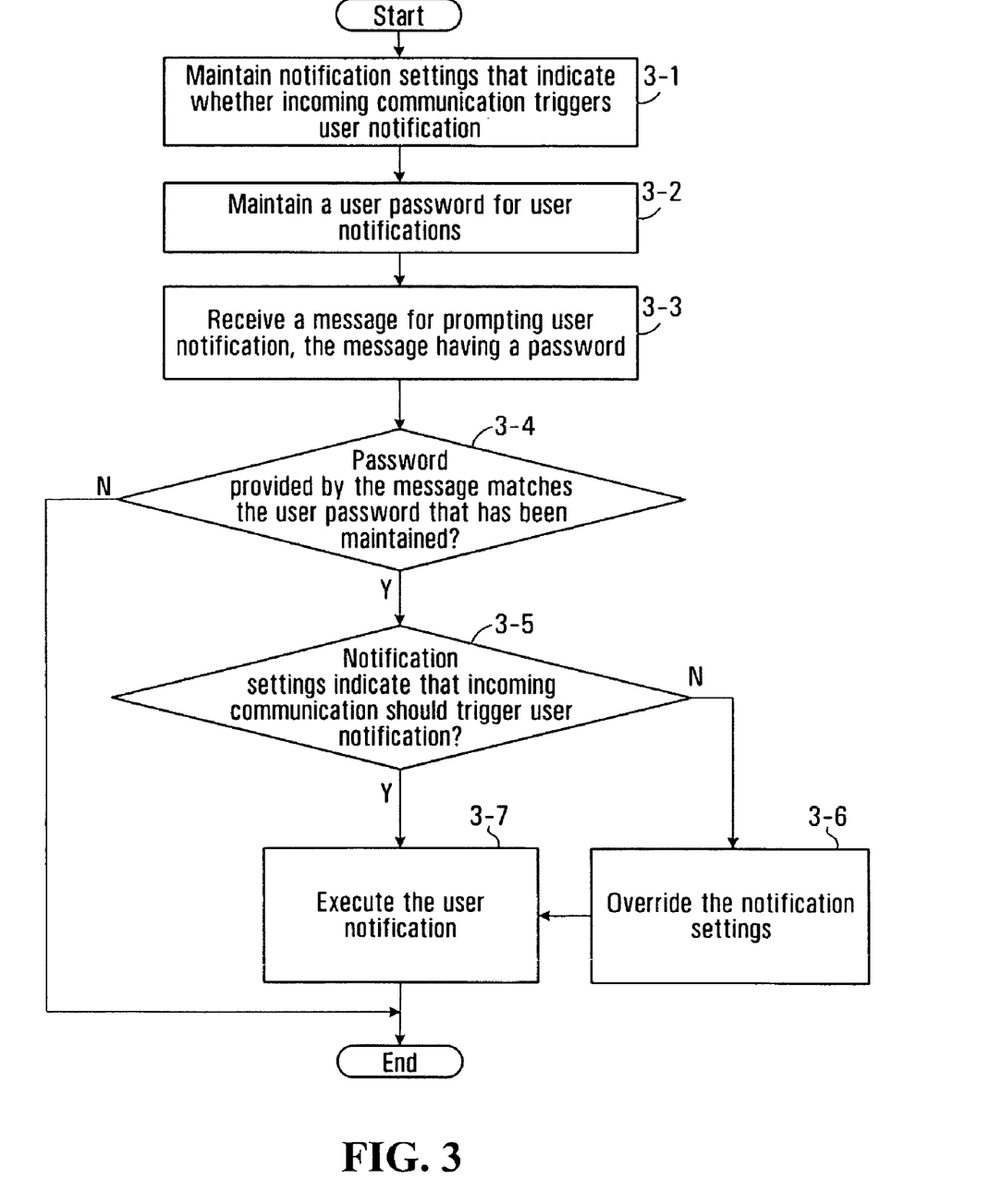
FIG. 3 is a flowchart of another method of a wireless device executing a user notification.

Referring now to FIG. 3, shown is a flowchart of another method of a wireless device executing a user notification. In this method there is a form of user authentication to help avoid unauthorised users from triggering user notification for the wireless device. This method may be implemented in a wireless device, for example by the notification initiator 13 of the wireless device 10 shown in FIG. 1. Alternatively, this method may be implemented in any appropriately configured wireless device. For this method it is assumed that the user has accidentally misplaced the wireless device. However, note that this is not a requirement for executing the method.

At step 3-1, the wireless device maintains notification settings that indicate whether incoming communication triggers user notification. Additionally, at step 3-2, the wireless device maintains a user password for user notifications. If the wireless device has been configured to not ring, then calling the wireless device will not help the user to locate the wireless device. A message for prompting user notification notwithstanding the notification settings is sent to the wireless device. Example details for the message have been described above. The message is routed through a wireless network and received by the wireless device at step 3-3. The wireless device determines whether the message is to trigger user notification notwithstanding the notification settings. Examples of how this determination can be performed have been provided above. In this example, it is assumed that the message also includes a password. The password might be encoded in the message in the event that the message is an email or SMS message, or in the event that the message is a phone call the password could be keyed in by the user during the phone call. If at step 3-4 the wireless device determines that the message is to trigger user notification notwithstanding the notification settings and the password provided by the message matches the user password that has been maintained, then a user notification will be executed notwithstanding the notification settings. Note that if there is no match in password, then a user notification will not be executed. By verifying that the password provided by the message matches the user password that has been maintained, user notification prompted by unauthorised users is prevented.

At steps 3-6 and 3-7, the wireless device executes the user notification notwithstanding the notification settings. If at step 3-5 the wireless device determines that the notification settings indicate that incoming communication should not trigger user notification, then at step 3-6 the wireless device overrides the notification settings so that the user notification can be executed. Finally, at step 3-7 the wireless device executes the user notification. Example details for the user notification have been described above.

In the illustrated example, if the notification settings indicate that incoming communication should trigger user notification, then the notification settings are not overridden. However, in some implementations the notification settings might be overridden. In some instances the notification settings might be overridden in order to change the way in which the user notification is executed. For instance, the notification settings might be overridden in order to allow an audible ringing when the notification settings would otherwise not allow this.

Method in a Computing Device

Figure 4:
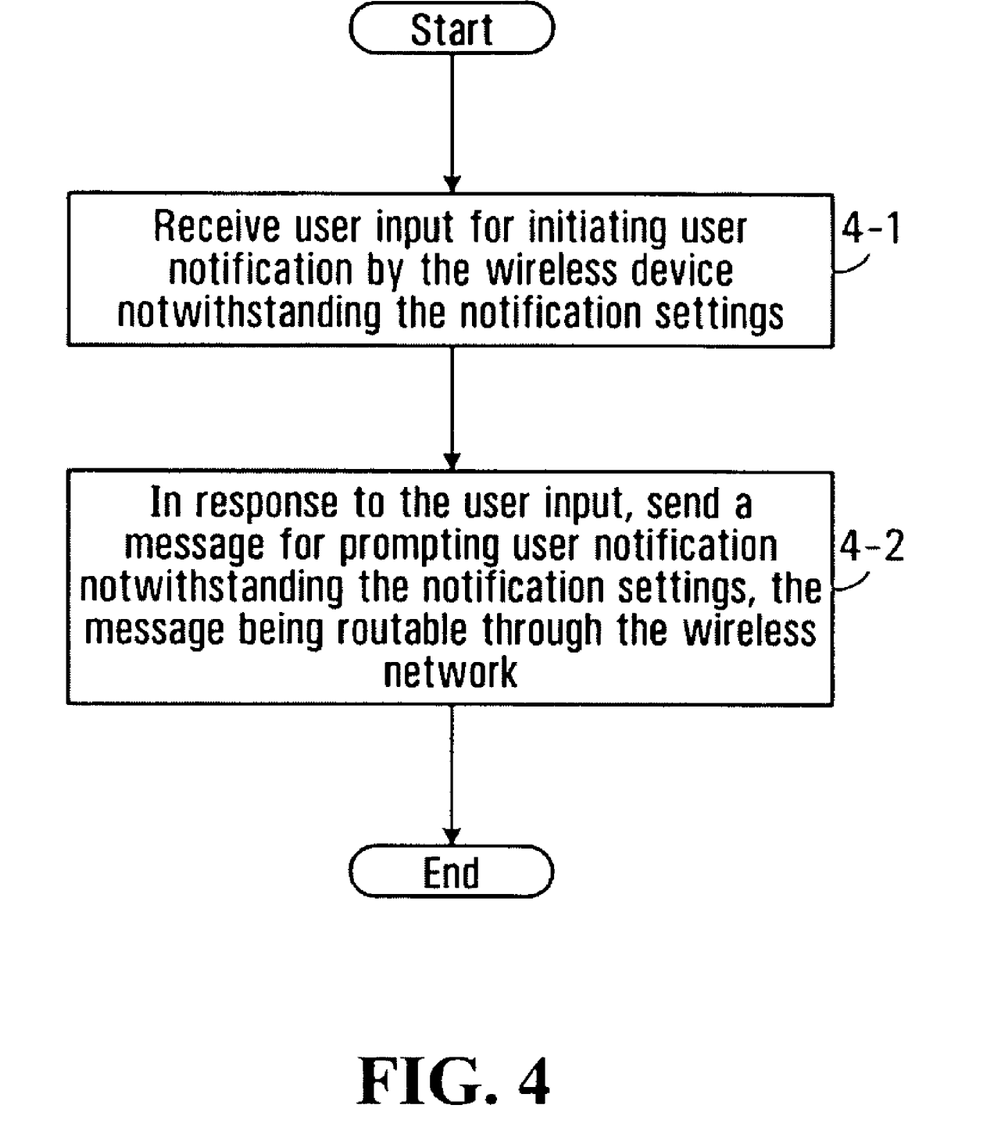
FIG. 4 is a flowchart of a method of a computing device messaging a wireless device for user notification.

Referring now to FIG. 4, shown is a flowchart of a method of a computing device messaging a wireless device for user notification. This method may be implemented in a computing device, for example by the notification messenger 32 of the computing device 30 shown in FIG. 1. Alternatively, this method may be implemented in any appropriately configured computing device.

At step 4-1, the computing device receives user input for initiating user notification by the wireless device notwithstanding notification settings. In some implementations, the user input involves a designated input, example details of which have been described above. At step 4-2, in response to the user input, the computing device sends a message for prompting user notification notwithstanding the notification settings. Example details for the message have been described above. The message is routed through a wireless network to the wireless device. In response to the message, the wireless device executes a user notification, example details of which have been described above.

In some implementations, the message includes a password for use in initiating user notification by the wireless device notwithstanding the notification settings. Example details of this have been described above.

In the example presented above with reference to FIG. 4, it is assumed that the computing device receives user input for sending the message for prompting user notification notwithstanding the notification settings. In alternative implementations, the computing device receives a message for prompting the user notification. For example, for implementations where the computing device is a call center device, the call center device might receive a call from the user who has misplaced the wireless device. In some implementations, the call center device accepts a password that is keyed in from the user during the phone call and if the password is correct then the call center device sends the message to the wireless device for initiating user notification notwithstanding the notification settings. Thus, the user that has misplaced the wireless device can call the call center and input the predetermined set of numbers in order to trigger the user notification. Other implementations are possible. More generally, the computing device can receive any appropriate input from which the computing device can deduce that a message is to be sent to the wireless device for initiating user notification notwithstanding notification settings.

Another Mobile Device

Figure 5:
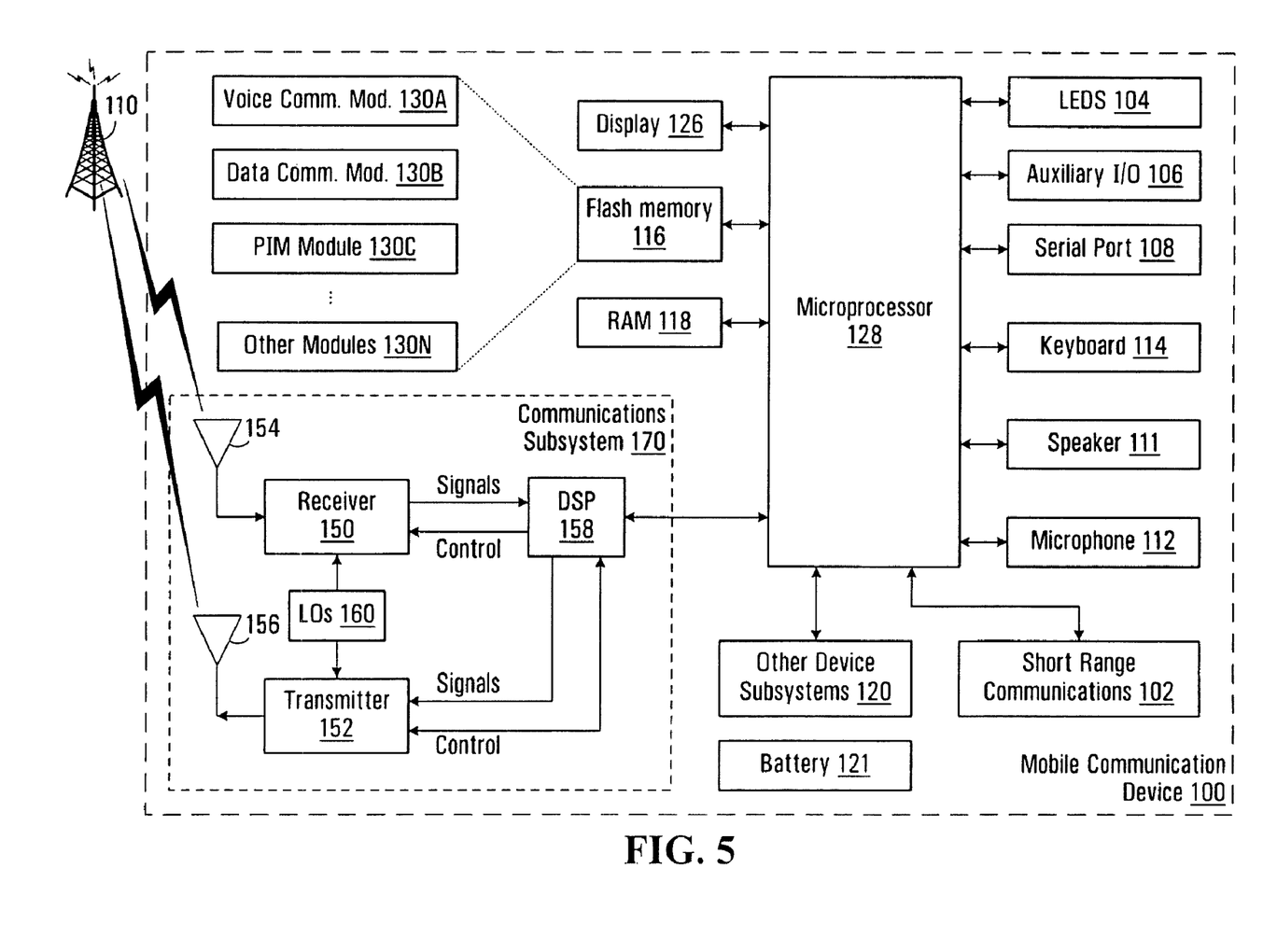
FIG. 5 is a block diagram of another mobile device.

Referring now to FIG. 5, shown is a block diagram of another mobile device 100 that may implement any of the mobile device methods described herein. The mobile device 100 is shown with specific components for implementing features similar to those of the mobile device 10 of FIG. 1. It is to be understood that the mobile device 100 is shown with very specific details for exemplary purposes only.

A processing device (a microprocessor 128) is shown schematically as coupled between a keyboard 114 and a display 126. The microprocessor 128 is a type of processor with features similar to those of the processor 14 of the mobile device 10 shown in FIG. 1. The microprocessor 128 controls operation of the display 126, as well as overall operation of the mobile device 100, in response to actuation of keys on the keyboard 114 by a user.

The mobile device 100 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the mobile device 100 are shown schematically. These include: a communications subsystem 170; a short-range communications subsystem 102; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The mobile device 100 may have a battery 121 to power the active elements of the mobile device 100. The mobile device 100 is in some embodiments a two-way radio frequency (RF) communication device having voice and data communication capabilities. In addition, the mobile device 100 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile device 100 may also be stored to the RAM 118.

The microprocessor 128, in addition to its operating system functions, enables execution of software applications on the mobile device 100. A predetermined set of software applications that control basic device operations, such as a voice communications module 130A and a data communications module 130B, may be installed on the mobile device 100 during manufacture. In addition, a personal information manager (PIM) application module 130C may also be installed on the mobile device 100 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture.

The flash memory 116 stores computer executable instructions for implementing features similar to those of the notification initiator 13 of the mobile device 10 shown in FIG. 1. In a specific implementation, the other module 130N of the flash memory 116 stores computer executable instructions that when executed implement a notification initiator. Note that the implementations described with reference to FIG. 5 are very specific for exemplary purposes.

Communication functions, including data and voice communications, are performed through the communication subsystem 170, and possibly through the short-range communications subsystem 102. The communication subsystem 170 includes a receiver 150, a transmitter 152 and one or more antennas, illustrated as a receive antenna 154 and a transmit antenna 156. In addition, the communication subsystem 170 also includes a processing module, such as a digital signal processor (DSP) 158, and local oscillators (LOs) 160. The communication subsystem 170 having the transmitter 152 and the receiver 150 is an implementation of a wireless access radio with features similar to those of the wireless access radio 12 of the mobile device 10 shown in FIG. 1. The specific design and implementation of the communication subsystem 170 is dependent upon the communication network in which the mobile device 100 is intended to operate. For example, the communication subsystem 170 of the mobile device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Examples of CDMA include 1X and 1x EV-DO. The communication subsystem 170 may also be designed to operate with an 802.11 Wi-Fi network, and/or an 802.16 WiMAX network. Other types of data and voice networks, both separate and integrated, may also be utilized with the mobile device 100.

Network access may vary depending upon the type of communication system. For example, in the Mobitex™ and DataTAC™ networks, mobile devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the mobile device 100 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the mobile device 100. In addition, the display 126 may also be utilized in voice communication mode, for example, to display the identity of a calling party, the duration of a voice call, or other voice call related information.

The short-range communications subsystem 102 enables communication between the mobile device 100 and other proximate systems or devices, which need not necessarily be similar devices. For example, the short range communications subsystem may include an infrared device and associated circuits and components, or a Bluetooth™ communication module to provide for communication with similarly-enabled systems and devices.

Numerous modifications and variations of the present disclosure are possible in light of the above teachings. It is therefore to be understood that within the scope of the appended claims, the disclosure may be practised otherwise than as specifically described herein.

I claim:

1. A method for execution in a wireless device, the method comprising:
   maintaining notification settings that indicate whether incoming communication triggers user notification;
   maintaining a user password for overriding the notification settings;
   receiving a message that has been routed through a wireless network from a computing device, the message comprising a password;
   determining whether the message is to trigger user notification based on whether the password provided by the message matches the user password that has been maintained; and
   when the message has been determined to trigger user notification but the notification settings indicate that incoming communication should not trigger user notification:
   overriding the notification settings; and
   executing the user notification.

2. The method of claim 1 wherein executing the user notification comprises generating audible noise.

3. The method of claim 1 wherein the user notification occurs for a predetermined time duration or for a predetermined schedule.

4. The method of claim 1 wherein the message is any one of an email message, an SMS message, and any packet switched message.

5. The method of claim 1 wherein the message comprises:
   a user address for use in routing the message to the wireless device, and
   a command;
   wherein determining whether the message is to trigger user notification comprises determining whether the command provided by the message prompts user notification.

6. The method of claim 1 wherein the message is any one of a voice call, and any circuit switched message.

7. The method of claim 6 wherein:
   the message has an originating phone number; and
   determining whether the message is to trigger user notification comprises determining whether messages from that originating phone number prompts user notification.

8. A non-transitory computer readable medium having computer executable instructions stored thereon for execution on a processor so as to implement a method comprising:
   maintaining notification settings that indicate whether incoming communication triggers user notification;
   maintaining a user password for overriding the notification settings;
   receiving a message that has been routed through a wireless network from a computing device, the message comprising a password;

determining whether the message is to trigger user notification based on whether the password provided by the message matches the user password that has been maintained; and when the message has been determined to trigger user notification but the notification settings indicate that incoming communication should not trigger user notification:

overriding the notification settings; and executing the user notification.

9. A wireless device comprising:

at least one memory configured for:

maintaining notification settings that indicate whether incoming communication triggers user notification; and maintaining a user password for overriding the notification settings;

a wireless access radio configured for receiving a message that has been routed through a wireless network from a computing device, the message comprising a password;

a notification initiator configured for:

determining whether the message is to trigger user notification based on whether the password provided by the message matches the user password that has been maintained; and when the message has been determined to trigger user notification but the notification settings indicate that incoming communication should not trigger user notification, overriding the notification settings and initiating the user notification; and a user interface configured for executing the user notification.

10. The wireless device of claim 9 wherein the user interface comprises a speaker for generating audible noise for the user notification.

11. A method for execution in a computing device, the computing device being capable of communicating with a wireless device having notification settings indicating that incoming communication should not trigger user notification, the method comprising:

receiving input for initiating user notification by the wireless device notwithstanding the notification settings; and in response to the input, sending a message for prompting user notification, the message being routed through a wireless network to the wireless device;

wherein the message comprises a password for overriding the notification settings thereby activating user notification by the wireless device notwithstanding the notification settings.

12. The method of claim 11 wherein receiving input for initiating user notification by the wireless device notwithstanding the notification settings comprises:

receiving user input for initiating user notification by the wireless device notwithstanding the notification settings.

13. The method of claim 11 wherein receiving input for initiating user notification by the wireless device notwithstanding the notification settings comprises:

receiving a phone call with a predetermined set of numbers keyed in during the phone call for initiating user notification by the wireless device notwithstanding the notification settings.

14. The method of claim 11 wherein the message is any one of an email message, an SMS message, any packet switched message, a voice call, and any circuit switched message.

15. A non-transitory computer readable medium having computer executable instructions stored thereon for execution on a processor so as to implement a method in a computing device, the computing device being capable of communicating with a wireless device having notification settings indicating that incoming communication should not trigger user notification, the method comprising:

receiving input for initiating user notification by the wireless device notwithstanding the notification settings; and in response to the input, sending a message for prompting user notification, the message being routed through a wireless network to the wireless device;

wherein the message comprises a password for overriding the notification settings thereby activating user notification by the wireless device notwithstanding the notification settings.

16. A computing device capable of communicating with a wireless device having notification settings indicating that incoming communication should not trigger user notification, the computing device comprising:

a user interface comprising an input designated for sending a message for prompting user notification; and a notification messenger configured to, in response to activation of the input, send a message configured for prompting user notification, the message being routed through a wireless network to the wireless device;

wherein the message comprises a password for overriding the notification settings thereby activating user notification by the wireless device notwithstanding the notification settings.

17. The computing device of claim 16 wherein the computing device is any one of a wireless device, a personal computer, an enterprise server, and a call center device.

18. The computing device of claim 16 wherein the input is a single designated button or a designated menu item.

* * * * *

UNITED STATES PATENT AND TRADEMARK OFFICE
CERTIFICATE OF CORRECTION

PATENT NO.         : 8,355,710 B2
APPLICATION NO.    : 12/118195
DATED              : January 15, 2013
INVENTOR(S)        : John Storozuk It is certified that error appears in the above-identified patent and that said Letters Patent is hereby corrected as shown below:

Title Page:

Item (73), "Assignee", the Assignee's city should read "Waterloo (CA)"

Signed and Sealed this
Eleventh Day of June, 2013

Teresa Stanek Rea
*Acting Director of the United States Patent and Trademark Office*